United States Patent
Park et al.

(10) Patent No.: US 10,147,932 B2
(45) Date of Patent: Dec. 4, 2018

(54) FABRICATING METHOD OF ELECTRODE ASSEMBLY AND ELECTROCHEMICAL CELL CONTAINING THE SAME

(71) Applicant: LG CHEM. LTD., Seoul (KR)

(72) Inventors: Ji Won Park, Daejeon (KR); Seung Jae You, Daejeon (KR); Myung Hoon Ko, Daejeon (KR); Jin Ho Ban, Daejeon (KR); Hyang Mok Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 242 days.

(21) Appl. No.: 14/458,819

(22) Filed: Aug. 13, 2014

(65) Prior Publication Data
US 2014/0349192 A1    Nov. 27, 2014

Related U.S. Application Data

(63) Continuation of application No. PCT/KR2013/004526, filed on May 23, 2013.

(30) Foreign Application Priority Data

May 23, 2012   (KR) .................. 10-2012-0055074
May 23, 2013   (KR) .................. 10-2013-0058165

(51) Int. Cl.
*H01M 4/04*     (2006.01)
*H01M 10/0583*  (2010.01)
(Continued)

(52) U.S. Cl.
CPC .............. *H01M 4/04* (2013.01); *H01G 11/12* (2013.01); *H01G 11/86* (2013.01); *H01M 2/145* (2013.01);
(Continued)

(58) Field of Classification Search
CPC ... H01G 11/12; H01G 11/86; H01M 10/0413; H01M 10/0445; H01M 10/0468;
(Continued)

(56) References Cited

U.S. PATENT DOCUMENTS 6,225,010 B1 *  5/2001  Hamano ............. H01M 2/1653
                                                29/623.4
6,383,234 B1 *  5/2002  Noh .................. H01M 10/0413
                                                29/623.1
(Continued)

FOREIGN PATENT DOCUMENTS

EP   2 725 649 A1   4/2014
EP   2 772 978 A1   9/2014
(Continued)

OTHER PUBLICATIONS

International Search Report issued in PCT/KR2013/004526, dated Sep. 26, 2013.
(Continued)

*Primary Examiner* — Lingwen R Zeng
(74) *Attorney, Agent, or Firm* — Birch, Stewart, Kolasch & Birch, LLP

(57) ABSTRACT

A fabricating method of an electrode assembly according to the present invention includes forming a radical unit having a four-layered structure obtained by stacking a first electrode, a first separator, a second electrode, and a second separator one by one, and stacking at least one radical unit one by one to form a unit stack part.

14 Claims, 8 Drawing Sheets

(51) Int. Cl.
   *H01M 10/04* (2006.01)
   *H01M 10/0525* (2010.01)
   *H01G 11/12* (2013.01)
   *H01G 11/86* (2013.01)
   *H01M 2/14* (2006.01)
   *H01M 2/16* (2006.01)

(52) U.S. Cl.
   CPC ......... *H01M 2/168* (2013.01); *H01M 2/1646* (2013.01); *H01M 2/1673* (2013.01); *H01M 4/0404* (2013.01); *H01M 10/0413* (2013.01); *H01M 10/0445* (2013.01); *H01M 10/0468* (2013.01); *H01M 10/0525* (2013.01); *H01M 10/0583* (2013.01); *Y02E 60/13* (2013.01); *Y02T 10/7011* (2013.01); *Y02T 10/7022* (2013.01); *Y10T 29/49108* (2015.01); *Y10T 29/49115* (2015.01)

(58) Field of Classification Search
   CPC ......... H01M 10/0525; H01M 10/0583; H01M 2/145; H01M 2/1646; H01M 2/1673; H01M 2/168; H01M 4/04; H01M 4/0404; Y02E 60/122; Y02E 60/13; Y02P 70/54; Y02T 10/7011; Y02T 10/7022; Y10T 29/49108; Y10T 29/49115
   See application file for complete search history.

(56) References Cited

U.S. PATENT DOCUMENTS

| | | | |
|---|---|---|---|
| 2002/0160257 A1* | 10/2002 | Lee | H01M 6/46 429/130 |
| 2002/0160258 A1 | 10/2002 | Lee et al. | |
| 2003/0013012 A1 | 1/2003 | Ahn et al. | |
| 2003/0087150 A1* | 5/2003 | Chung | H01M 2/1673 429/129 |
| 2006/0046149 A1 | 3/2006 | Yong et al. | |
| 2006/0115718 A1 | 6/2006 | Parsian et al. | |
| 2007/0180686 A1* | 8/2007 | Woo | H01M 4/13 29/623.1 |
| 2010/0003590 A1* | 1/2010 | Park | H01M 2/1673 429/144 |
| 2010/0175245 A1 | 7/2010 | Do et al. | |
| 2010/0190081 A1* | 7/2010 | Park | H01M 2/206 429/452 |
| 2010/0304198 A1 | 12/2010 | Ahn et al. | |
| 2011/0135996 A1 | 6/2011 | Ahn et al. | |
| 2011/0281172 A1 | 11/2011 | Yong et al. | |
| 2012/0121964 A1 | 5/2012 | Park et al. | |
| 2012/0225345 A1 | 9/2012 | Kim | |
| 2013/0183570 A1 | 7/2013 | Yong et al. | |
| 2013/0209848 A1 | 8/2013 | Min et al. | |
| 2014/0011070 A1 | 1/2014 | Kim et al. | |
| 2014/0134472 A1 | 5/2014 | Kim | |
| 2014/0212729 A1 | 7/2014 | Park et al. | |
| 2014/0349192 A1 | 11/2014 | Park et al. | |

FOREIGN PATENT DOCUMENTS

| | | |
|---|---|---|
| EP | 2 802 025 A1 | 9/2014 |
| EP | 2 808 933 A1 | 12/2014 |
| JP | 2005-302634 A | 10/2005 |
| JP | 2010-50075 A | 3/2010 |
| JP | 2010-529617 A | 8/2010 |
| JP | 2011-86506 A | 4/2011 |
| JP | 2011-175749 A | 9/2011 |
| KR | 2001-0082058 A | 8/2001 |
| KR | 2001-0082059 A | 8/2001 |
| KR | 2001-0082060 A | 8/2001 |
| KR | 10-2003-0066960 A | 8/2003 |
| KR | 10-2004-0082874 A | 9/2004 |
| KR | 10-2007-0118715 A | 12/2007 |
| KR | 10-2008-0005629 A | 1/2008 |
| KR | 10-2008-0074239 A | 8/2008 |
| KR | 10-2011-0112241 A | 10/2011 |
| WO | WO 2004/097971 A1 | 11/2004 |
| WO | WO 2006/025662 A1 | 3/2006 |
| WO | WO 2011/126310 A2 | 10/2011 |
| WO | WO 2012/008742 A2 | 1/2012 |

OTHER PUBLICATIONS

Extended European Search Report, dated Dec. 2, 2015, for European Application No. 14801827.8.
European Search Report for Appl. No. 13794327.0 dated Jun. 12, 2015.

* cited by examiner

[FIG. 1]
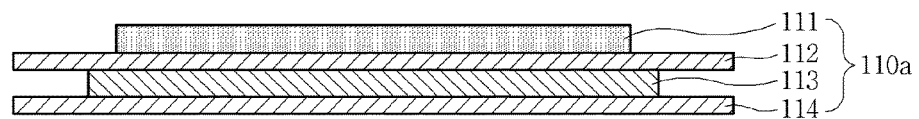
[FIG. 2]
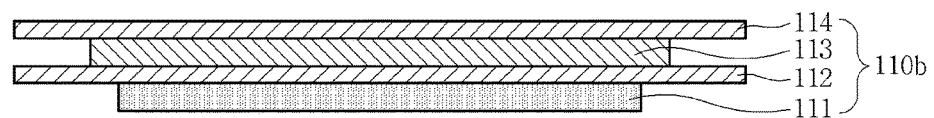
[FIG. 3]
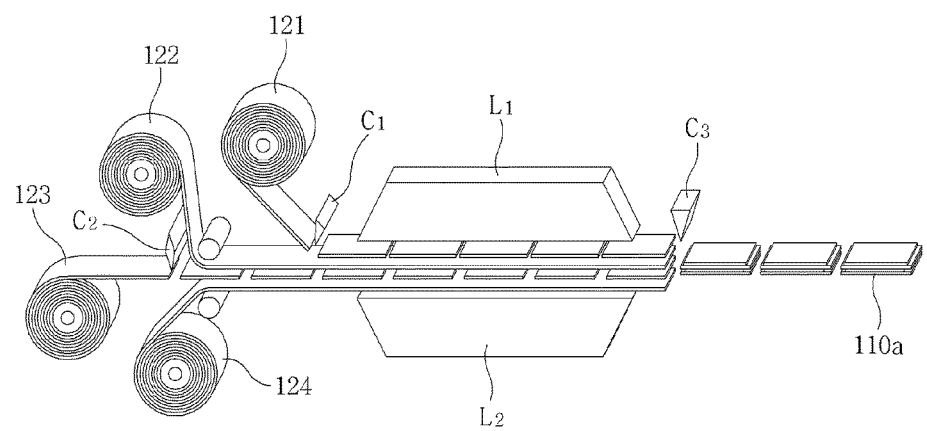

[FIG. 4]
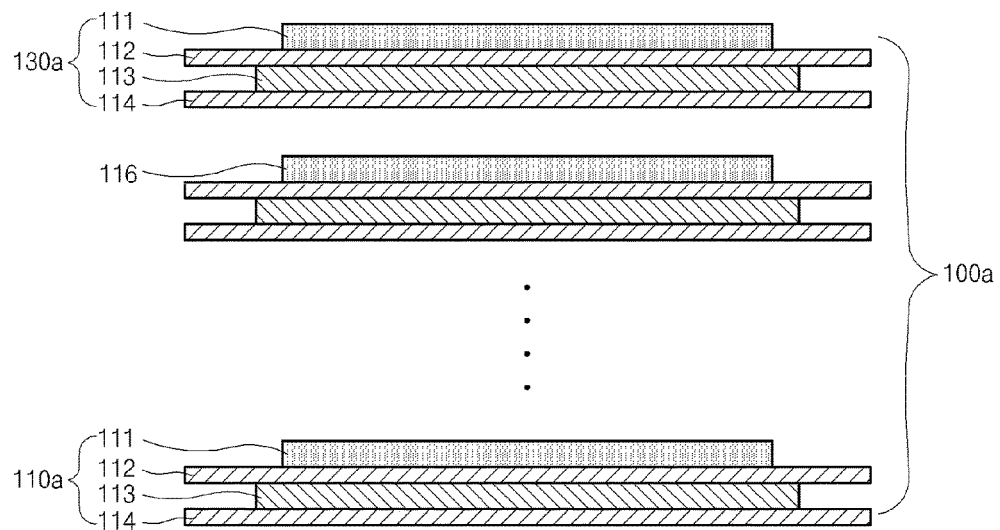
[FIG. 5]
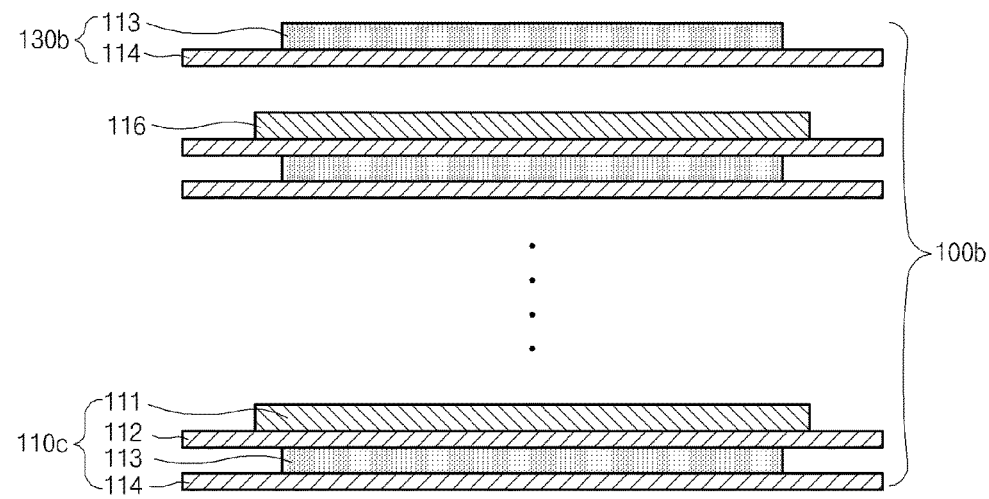

[FIG. 6]
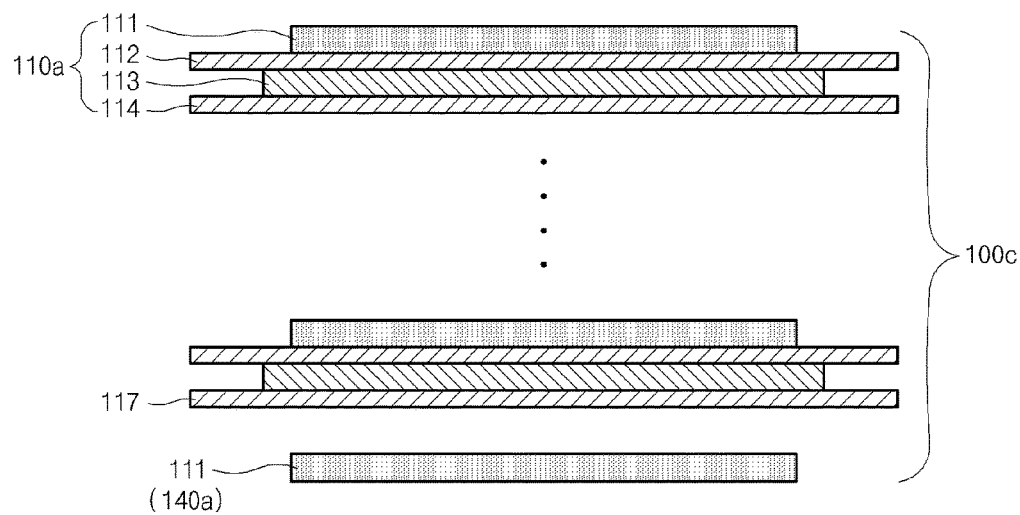
[FIG. 7]
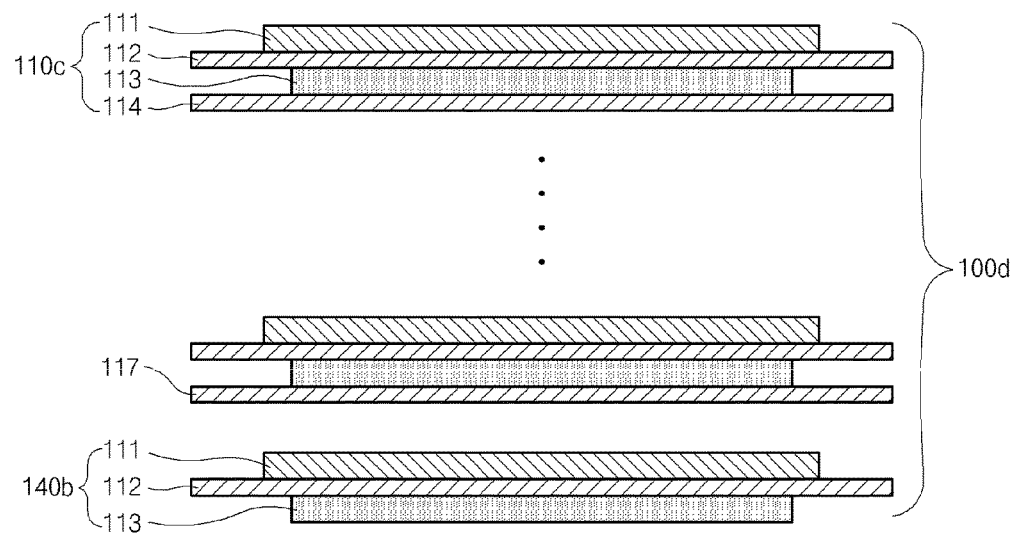

[FIG. 8]
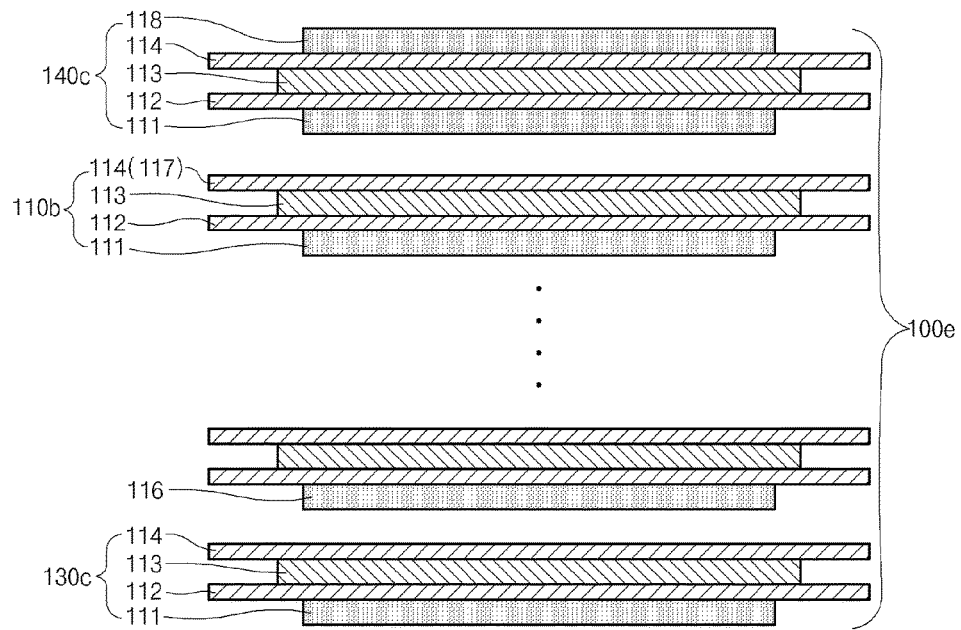
[FIG. 9]
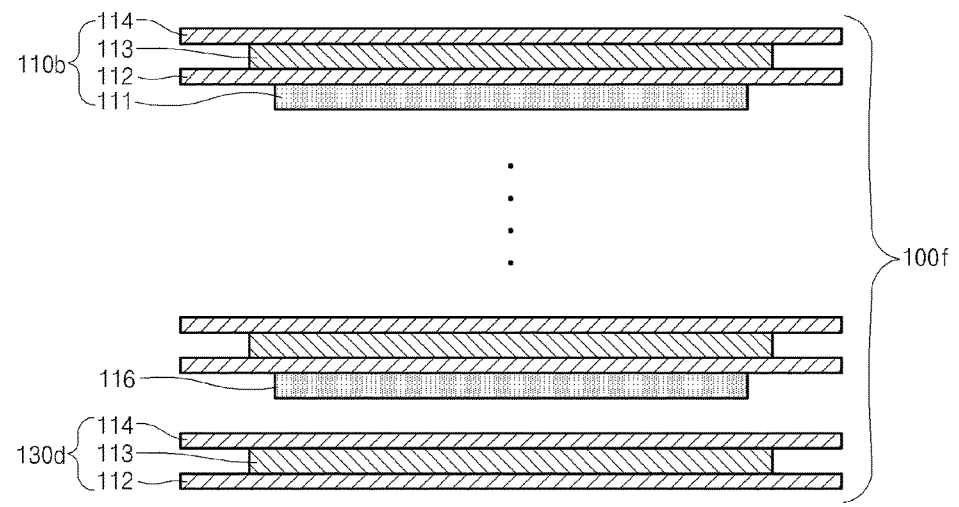

[FIG. 10]
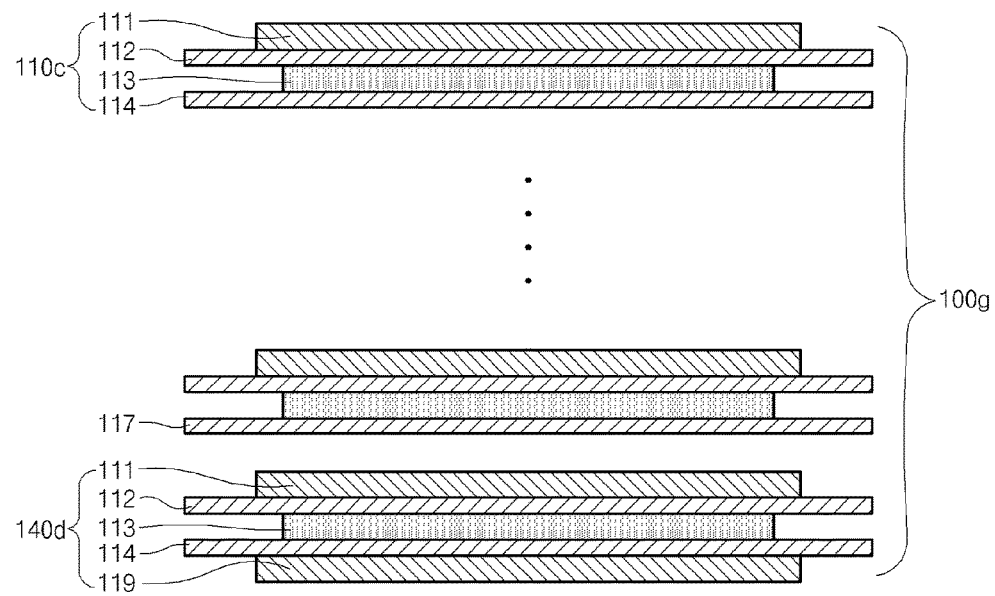
[FIG. 11]
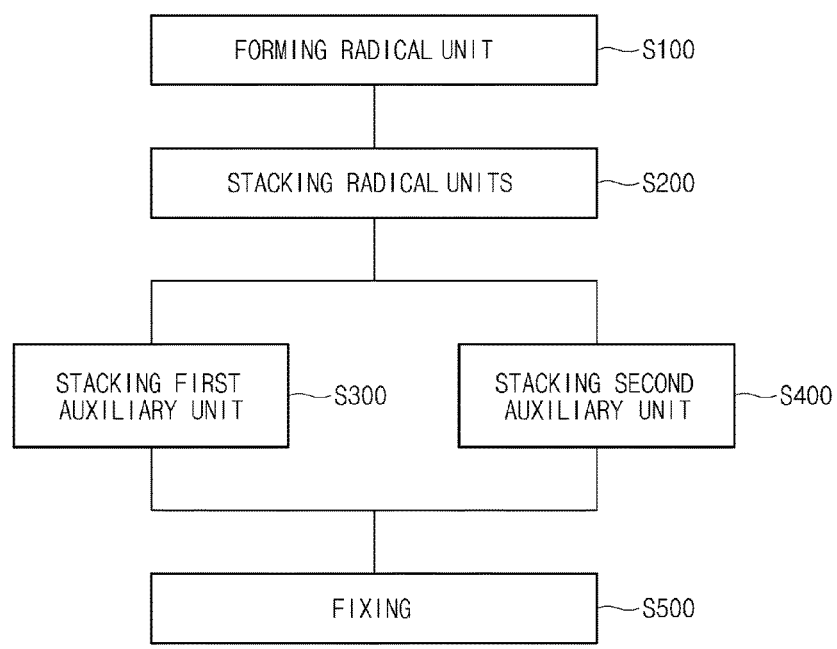

[FIG. 12]
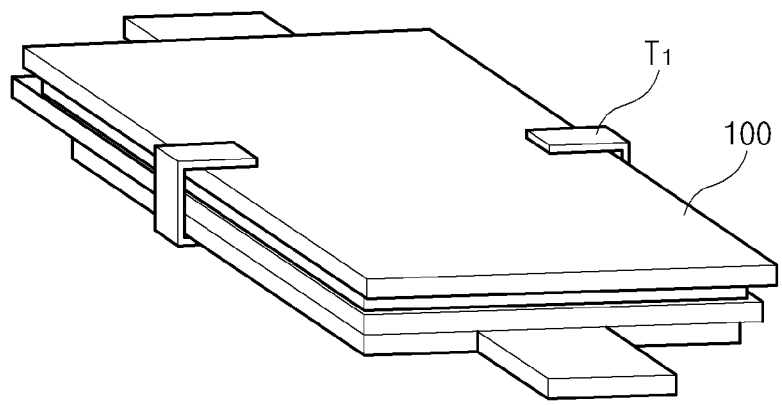
(a)
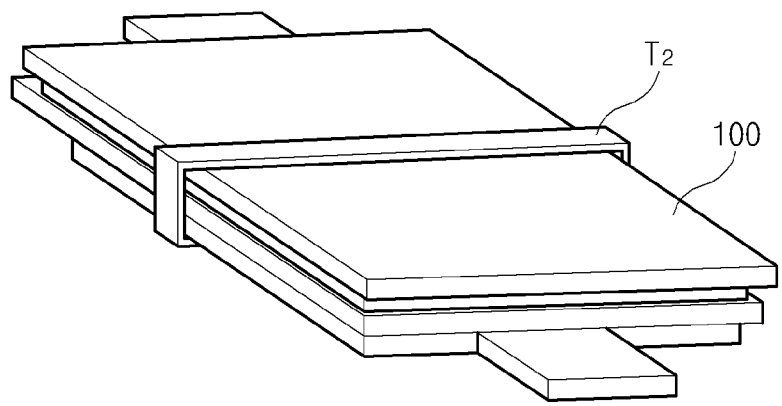
(b)

(a)
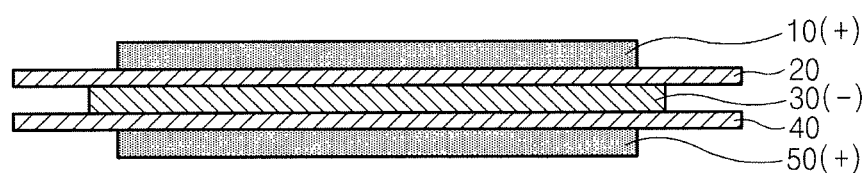
(b)
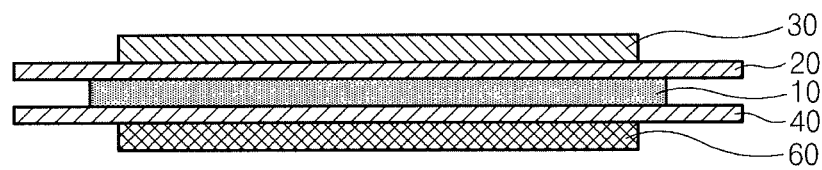
FIG.14
<Prior Art>

FABRICATING METHOD OF ELECTRODE ASSEMBLY AND ELECTROCHEMICAL CELL CONTAINING THE SAME

This application is a Continuation of PCT International Application No. PCT/KR2013/004526, filed on May 23, 2013, which claims priority under 35 U.S.C. 119(a) to patent application Ser. No. 10-2012-0055074, filed in the Republic of Korea on May 23, 2012, and to patent application Ser. No. 10-2013-0058165, filed in the Republic of Korea on May 23,. 2013, all of which are hereby expressly incorporated by reference into the present application.

FIELD OF THE INVENTION

The present invention relates to a fabricating method of an electrode assembly manufactured by a stacking method other than a folding method, and an electrochemical cell containing the same.

BACKGROUND OF THE ART

A secondary battery attracts attention as a power source of an electric vehicle (EV), a hybrid electric vehicle (HEV), a parallel hybrid electric vehicle (PHEV), and the like, which have been suggested as alternatives for solving defects such as environmental contamination due to commonly used gasoline vehicles, diesel vehicles, and the like using fossil fuels. In a medium and large size device such as automobiles, a medium and large size battery module in which a plurality of battery cells is electrically connected is used due to the need of high power and high capacity.

However, since the medium and large size battery module is necessary to be manufactured so as to have a small size and a light weight, a square shape battery, a pouch shape battery, etc., which may be stacked in a high degree and have a light weight when compared with the capacity, are widely used as the battery cells of the medium and large size battery module.

Generally, an electrode assembly may be classified according to the structure of the electrode assembly having cathode/separator/anode. Typically, the electrode assembly may be classified into a jelly-roll (a wrapping type) electrode assembly, in which cathodes and anodes having long sheet shapes along with an interposed separator are wrapped, a stack type (a laminated type) electrode assembly, in which a plurality of cathodes and anodes along with interposed separators, which are cut into specific size units and stacked one by one, and a stack/folding type electrode assembly. The stack/folding type and the stack type electrode assemblies are typically used, and defects on each structure will be explained.

First, the stack/folding type electrode assembly disclosed in Korean Patent Application Publication Nos. 2001-0082058, 2001-0082059 and 2001-0082060 filed by the present Applicant will be explained.

Referring to FIG. 13, an electrode assembly 1 of a stack/folding structure includes a plurality of overlapped full cells 2, 3, 4 ... (Hereinafter, will be referred to as 'full cell') as a unit cells, in which cathode/separator/anode are positioned in sequence. In each of the overlapped parts, a separator sheet 5 is interposed. The separator sheet 5 has a unit length possibly wrapping the full cells. The separator sheet 5 initiated from the central full cell 10 is bent inward by the unit length while continuously wrapping each of the full cells to the outermost full cell 14 so as to be interposed in the overlapped parts of the full cells. The distal end portion of the separator sheet 5 is finished by conducting heat welding or attaching using an adhesion tape 6. The stack/folding type electrode assembly is manufactured by, for example, arranging the full cells 2, 3, 4 ... on the separator sheet 5 having a long length and wrapping from one end portion of the separator sheet 5 in sequence. However, in this structure, a temperature gradient may be generated between the electrode assemblies 1a, 1b and 2 in the center portion and the electrode assemblies 3 and 4 disposed at the outer portion to produce different heat emitting efficiency. Thus, the lifetime of the electrode assembly may be decreased when used for a long time.

The manufacturing process of the electrode assembly is conducted by using two lamination apparatuses for manufacturing each electrode assembly and one additional folding apparatus as a separate apparatus. Therefore, the decrease of the tack time of the manufacturing process has a limitation. Particularly, the minute aligning of the electrode assemblies disposed up and down is difficult in the structure accomplishing the stacked structure through the folding. Thus, the manufacture of an assembly having a reliable quality is very difficult.

FIG. 14 illustrates the structures of A type and C type bicells different from the full cell structure as a unit cell applicable in the above-described folding structure in FIG. 13. At the center portion which is an initiating point of wrapping among the overlapped electrochemical cells applicable in the present invention, a bicell having a cathode/separator/anode/separator/cathode structure (a) (A type bicell), or a bicell having a anode/separator/cathode/separator/anode structure (b) (C type bicell), surrounded by a separator sheet is disposed. That is, the structure of a common bicell may be accomplished by 'A type bicell' having a stacked structure of a double sided cathode 10, a separator 20, a double sided anode 30, a separator 40, a double sided cathode 50 one by one as illustrated in FIG. 14 (a), or a stacked structure of a double sided anode 30, a separator 20, a double sided cathode 10, a separator 40, and a double sided anode 50 one by one as illustrated in FIG. 14 (b).

For the structure of the electrode assembly using the folding process, a folding apparatus is separately necessary. When a bicell structure is applied, two types of the bicells of the A type and the C type, are manufactured and stacked. Before conducting the folding, the keeping of the distance between one bicell and another bicell disposed on a long separator sheet is a very difficult task. That is, an accurate alignment between the upper and lower unit cells may be difficult. When manufacturing a high capacity cell, a considerable time may be necessary for changing the types.

Next, a stack type electrode assembly will be explained. Since the stack type electrode assembly is widely known in this art, only on the defects of the stack type electrode assembly will be explained in brief.

Generally, in the stack type electrode assembly, the length and the width of a separator are greater than those of an electrode. The separator is stacked on a magazine or a jig having corresponding size with respect to the length and the width of the separator, and the stacking process of the electrode on the separator is repeatedly conducted to manufacture the stack type electrode assembly.

However, when the stack type electrode assembly is manufactured by the above-described method, the electrode and the separator are necessary to be stacked one by one. Thus, the working time is increased to remarkably lower the productivity. In addition, the alignment of the plurality of the separators by the length and the width is possible. However, since the magazine or the jig accurately aligning the electrodes put on the separator is not present, the plurality of the electrodes provided in the stack type electrode assembly may not be aligned but may be dislocated.

In addition, since the faces of the cathode and the anode across the separator are dislocated, an electrochemical reaction may not be made in a portion of the active material region coated on the surfaces of the cathode and the anode. Thus, the efficiency of a battery cell may be deteriorated.

SUMMARY OF THE INVENTION

An aspect of the present invention considering the above-described defects, provides a fabricating method accomplishing the maximization of simplifying a process and a cost reduction by manufacturing a unit cell having a radical unit structure, deviated from the unit cell of the A or C type bicell structure, which is applicable in the folding process, and by manufacturing a secondary battery through conducting only a stacking process other than a folding process.

According to an aspect of the present invention, there is provided a fabricating method of an electrode assembly including forming a radical unit having a four-layered structure obtained by stacking a first electrode, a first separator, a second electrode, and a second separator one by one, and stacking at least one radical unit one by one to form a unit stack part.

Further, the method may further include a step of stacking a first auxiliary unit on a first distal end electrode which is the first electrode positioned at the uppermost or the lowermost portion of the unit stack part, and a step of stacking a second auxiliary unit on a second distal end electrode which is the second electrode positioned at the uppermost or the lowermost portion of the unit stack part.

In addition, the method may further include a step of fixing by taping the side portion or the front portion of the unit stack part by using a polymer tape.

EFFECT OF THE INVENTION

According to the fabricating method of an electrode assembly of the present invention, radical units may be minutely aligned and the productivity may be increased.

In addition, according to the fabricating method of an electrode assembly of the present invention, a coating material is coated only on one side of a second separator facing a second electrode, and a cost reduction effect may be large.

In addition, according to the fabricating method of an electrode assembly of the present invention, only a step of stacking a first auxiliary unit and a second auxiliary unit including only one coated layer of an active material layer at the outermost portion on a unit stack part is included, and the waste of the active material layer may be prevented.

BRIEF DESCRIPTION OF THE DRAWINGS

The above and other aspects, features and other advantages of the present invention will be more clearly understood from the following detailed description taken in conjunction with the accompanying drawings, in which:

FIG. 1 is a side view illustrating a first structure of a radical unit according to the present invention;

FIG. 2 is a side view of a second structure of a radical unit according to the present invention;

FIG. 3 illustrates a process for manufacturing a radical unit according to the present invention;

FIG. 4 is a side view illustrating a first structure of a unit stack part including a radical unit and a first auxiliary unit according to the present invention;

FIG. 5 is a side view illustrating a second structure of a unit stack part including a radical unit and a first auxiliary unit according to the present invention;

FIG. 6 is a side view illustrating a third structure of a unit stack part including a radical unit and a second auxiliary unit according to the present invention;

FIG. 7 is a side view illustrating a fourth structure of a unit stack part including a radical unit and a second auxiliary unit according to the present invention;

FIG. 8 is a side view illustrating a fifth structure of a unit stack part including a radical unit, a first auxiliary unit and a second auxiliary unit according to the present invention;

FIG. 9 is a side view illustrating a sixth structure of a unit stack part including a radical unit and a first auxiliary unit according to the present invention;

FIG. 10 is a side view illustrating a seventh structure of a unit stack part including a radical unit and a second auxiliary unit according to the present invention;

FIG. 11 is a flow chart illustrating a fabricating method of an electrode assembly according to the present invention;

FIG. 12 is a conceptual diagram illustrating a fixing part of an electrode assembly according to the present invention;

FIG. 14 is a side view illustrating A type and C type bicell structures applicable in the folding structure in FIG. 13.

DETAILED DESCRIPTION OF THE PREFERRED EMBODIMENT

Figure 13:
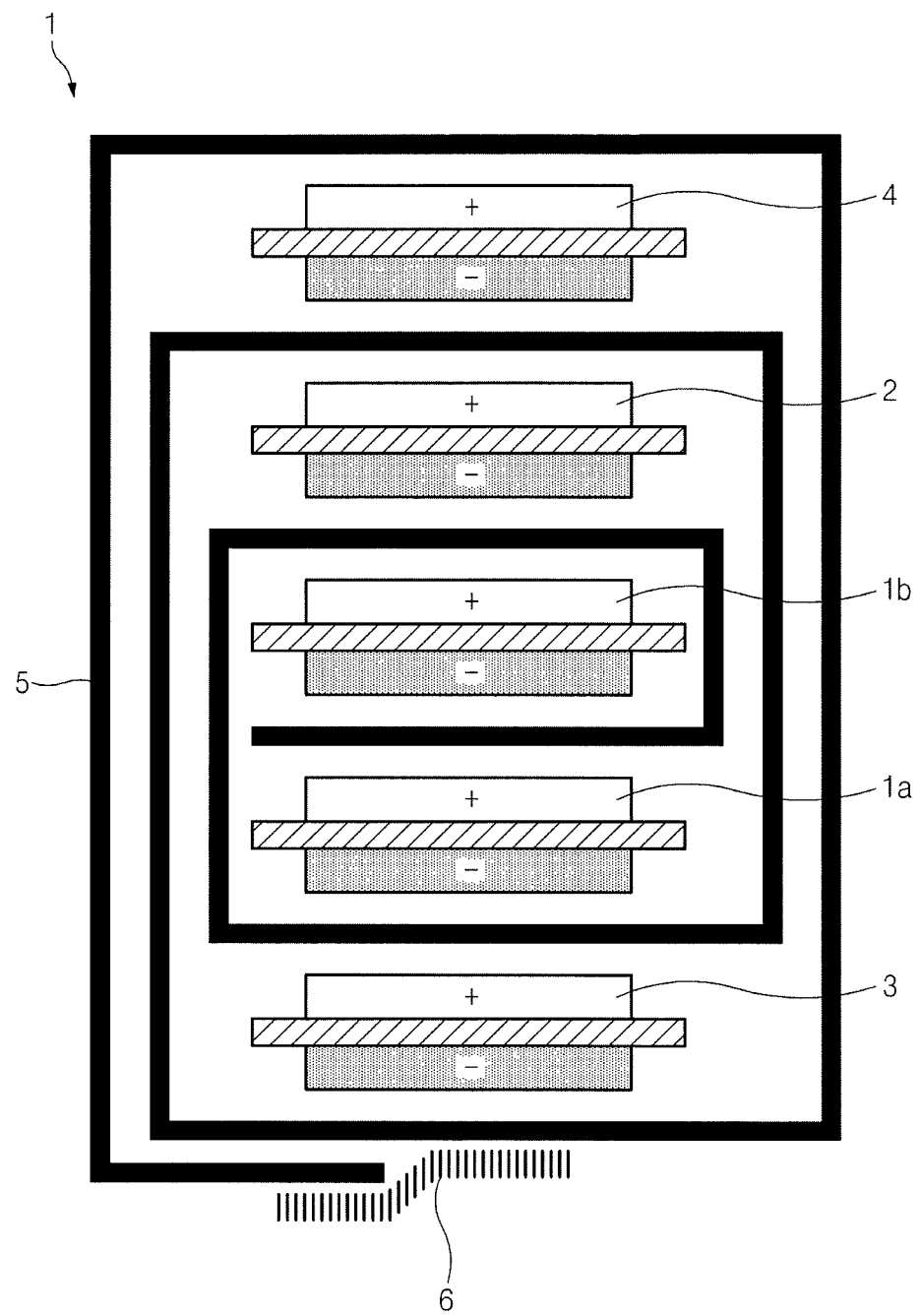
FIG. 13 is a conceptual diagram illustrating a folding structure of an electrode assembly according to related arts.

Exemplary embodiments of the present invention will now be described in detail with reference to the accompanying drawings. However, the present invention is not restricted or limited to the following exemplary embodiments.

A unit stack part (see 100a in FIG. 4) includes at least one radical unit (see 110a in FIG. 1, etc.). That is, a unit stack part 100 includes one radical unit 110 or at least two radical units 110. The unit stack part 100 is formed by stacking the radical units 110. For example, the unit stack part 100 may be formed by stacking one radical unit 110 on another radical unit 110. As described-above, the unit stack part 100 is formed by stacking the radical units 110 as a unit. That is, the radical units 110 are previously formed and then stacked one by one to form the unit stack part 100.

As described above, the unit stack part 100 in accordance with this example embodiment has basic features in repeatedly stacking the radical units 110 for the manufacture thereof. Through manufacturing the unit stack part 100 by the above-described method, merits may be obtained, that the radical unit 110 may be minutely aligned, and the productivity may be improved.

The radical unit 110 is formed by stacking a first electrode 111, a first separator 112, a second electrode 113 and a second separator 114 one by one. As described above, the radical unit 110 basically includes a four-layered structure. More particularly, the radical unit 110 may be formed by stacking the first electrode 111, the first separator 112, the second electrode 113 and the second separator 114 one by one from the upper portion to the lower portion as illustrated in FIG. 1, or may be formed by stacking the first electrode 111, the first separator 112, the second electrode 113 and the second separator 114 one by one from the lower portion to the upper portion as illustrated in FIG. 2. In this case, the first electrode 111 and the second electrode 113 have opposite electrodes to each other. For example, when the first electrode 111 is a cathode, the second electrode 113 is an anode. Of course, the reverse case may be possible.

The radical unit 110 may be formed by the following process (see FIG. 3). First, a first electrode material 121, a first separator material 122, a second electrode material 123 and a second separator material 124 are prepared. In this case, the electrode materials 121 and 123 are cut into a certain size to form the electrodes 111 and 113, which will be described herein below. Similarly, the separator materials 122 and 124 are cut into a certain size. For process automation, the electrode materials and the separator materials may preferably have a wrapped shape on a roll. After preparing the materials, the first electrode material 121 is cut into the certain size by means of a cutter $C_1$. Then, the second electrode material 123 also is cut into the certain size by means of a cutter $C_2$. Then, the first electrode material 121 having the certain size is supplied on the first separator material 122. The second electrode material 123 having the certain size also is supplied on the second separator material 124. Then, all of the materials are supplied to laminators $L_1$ and $L_2$.

As described above, the unit stack part 100 is formed by repeatedly stacking the radical units 110. However, when the electrode and the separator constituting the radical unit 110 are separated from each other, the repeated stacking of the radical units 110 may be very difficult. Thus, the electrode and the separator may be preferably attached to each other when forming the radical units 110. The laminators $L_1$ and $L_2$ are used for attaching the electrode and the separator to each other. That is, the laminators $L_1$ and $L_2$ apply a pressure, or heat and pressure to the materials to accomplish the attachment of the electrode material and the separator material. The electrode material and the separator material are attached to each other by means of the laminators $L_1$ and $L_2$. Through the attachment, the radical units 110 may maintain the shape itself more stably.

Finally, both of the first separator material 122 and the second separator material 124 are cut into a certain size by using a cutter $C_3$. Through the cutting, the radical units 110 may be formed. Various kinds of inspections may be additionally conducted with respect to the radical units 110. For example, inspections on thickness, vision, short, or the like may be additionally conducted.

Meanwhile, the surface of the separator (separator material) may be coated with a coating material having adhesiveness. In this case, the coating material may be a mixture of inorganic particles and a binder polymer. The inorganic particles may improve the thermal stability of the separator. That is, the inorganic particles may prevent the contraction of the separator at a high temperature. In addition, the binder polymer may fix the inorganic particles. Thus, the inorganic particles may include certain pore structures. Due to the pore structure, ions may smoothly move from the cathode to the anode, even though the inorganic particles are coated on the separator. In addition, the binder polymer may keep the inorganic particles stably on the separator to improve the mechanical stability of the separator. Further, the binder polymer may attach the separator onto the electrode more stably. For reference, the separator may be formed by using a polyolefin-based separator substrate.

However, as illustrated in FIGS. 1 and 2, at both sides of the first separator 112, the electrodes 111 and 113 are positioned. However, only one electrode 113 is positioned at one side of the second separator 114. Thus, the coating material may be coated on both sides of the first separator 112, while the coating material may be coated on one side of the second separator 114. That is, both sides of the first separator 112 facing the first electrode 111 and the second electrode 113 may be coated with the coating material, and one side of the second separator 114 facing the second electrode 113 may be coated with the coating material.

As described above, the attachment by using the coating material may be sufficient when accomplished within the radical unit . Thus, the coating may be conducted with respect to only one side of the second separator 114 as described above. Merely, since adhesion among the radical units may be accomplished by applying a method such as heat press, both sides of the second separator 114 may be coated as occasion demands. That is, the coating material may be coated on one side of the second separator 114 facing the second electrode 113 and on the opposite side thereof. In this case, the radical unit positioned at the upper portion and the radical unit positioned just below thereof may make an attachment through the coating material on the outer surface of the second separator.

For reference, when a coating material having adhesiveness is coated on the separator, the direct pressurization onto the separator by using an object is not recommended. Generally, the separator is extended outwardly from the electrode. An attempt may be made to combine the distal end portion of the first separator 112 and the distal end portion of the second separator 114 to each other. For example, an attempt for welding the distal end portion of the first separator 112 and the distal end portion of the second separator 114 by means of sonication welding may be made. For the sonication welding, a target is necessary to be directly pressurized by using a horn. However, when the distal end portions of the separators are directly pressurized by using the horn, the horn may attach to the separator due to the coating material having the adhesiveness. In this case, the apparatus may be broken. Therefore, when the coating material having the adhesiveness is coated on the separator, the direct application of the pressure onto the separator by using an object is not preferable.

In addition, the radical unit 110 does not necessarily include the four-layered structure. For example, the radical unit 110 may have an eight-layered structure formed by stacking the first electrode 111, the first separator 112, the second electrode 113, the second separator 114, the first electrode 111, the first separator 112, the second electrode 113 and the second separator 114 one by one . That is, the radical unit 110 may have a structure formed by repeatedly stacking the four-layered structure. As described above, the unit stack part 100 may be formed by repeatedly stacking the radical units 110. Thus, the unit stack part 100 may be formed by repeatedly stacking the four-layered structure, or the unit stack part 100 may be formed by repeatedly stacking, for example, the eight-layered structure.

Meanwhile, the unit stack part 100 may further include at least one of a first auxiliary unit 130 and a second auxiliary unit 140. First, the first auxiliary unit 130 will be explained. The radical unit 110 is formed by stacking the first electrode 111, the first separator 112, the second electrode 113 and the second separator 114 from the upper portion to the lower portion, or from the lower portion to the upper portion, one by one . When the unit stack part 100 is formed by repeatedly stacking the radical units 110, the first electrode 116 (Hereinafter, will be referred to as 'first distal end electrode') may be positioned at the uppermost portion (see FIG. 1), or at the lowermost portion (see FIG. 2) of the unit stack part 100 (the first distal end electrode may be an cathode or a anode.). The first auxiliary unit 130 may be additionally stacked on the first distal end electrode 116.

More particularly, as illustrated in FIG. 4, when the first electrode 111 is a cathode, and the second electrode 113 is an anode, the first auxiliary unit 130*a* may be formed by stacking from the first distal end electrode 116, that is, to the outer portion from the first distal end electrode 116 (to the upper portion in FIG. 4), the separator 114, the anode 113, the separator 112 and the cathode 111 one by one. In addition, as illustrated in FIG. 5, when the first electrode 111 is the anode, and the second electrode 113 is the cathode, the first auxiliary unit 130*b* may be formed by stacking from the first distal end electrode 116, that is, to the outer portion from the first distal end electrode 116, the separator 114 and the cathode 113 one by one. As illustrated in FIGS. 4 and 5, in the unit stack part 100, the cathode may be positioned at the outermost portion of the first distal end electrode 116 due to the first auxiliary unit 130.

Generally, an electrode includes a current collector and active material layers (active material) coated on both sides of the current collector. Thus, the active material layer positioned under the current collector among the active material layers of the cathode makes a reaction with the active material layer positioned on the current collector among the active material layers of the cathode in FIG. 4 through the separator. When the unit stack part 100 is formed by manufacturing the same radical units 110 and stacking thereof one by one, the first distal end electrode positioned at the uppermost portion or the lowermost portion of the unit stack part 100 may include the active material layers on both sides of the current collector as another first electrode. However, when the first distal end electrode has a structure including the active material layers coated on both sides of the current collector, the active material layer positioned at the outer portion among the active material layers of the first distal end electrode may not make a reaction with another active material layer. Thus, the wasting of the active material layer may be generated.

The first auxiliary unit 130 is provided to solve the above-mentioned defects. That is, the first auxiliary unit 130 is separately formed from the radical units 110. Thus, the first auxiliary unit 130 may include an cathode including the active material layer formed only on one side of the current collector. That is, the first auxiliary unit 130 may include an cathode including the active material layer coated only on one side facing the radical unit 110 (a side facing the lower portion in FIG. 4) among both sides of the current collector. Consequently, when the unit stack part 100 is formed by additionally stacking the first auxiliary unit 130 on the first distal end electrode 116, the cathode including the coated layer only on one outermost side of the first distal end electrode 116 may be disposed. Thus, the defects on the waste of the active material layer may be solved. Since the cathode has a constitution releasing, for example, nickel ions, the provision of the cathode at the outermost portion is preferred when considering battery capacity.

Then, the second auxiliary unit 140 will be explained. The second auxiliary unit 140 basically exhibits the same function as the first auxiliary unit 130. More particularly, the radical unit 100 is formed by stacking the first electrode 111, the first separator 112, the second electrode 113 and the second separator 114 from the upper portion to the lower portion, or from the lower portion to the upper portion, one by one. When the unit stack part 100 is formed by repeatedly stacking the radical units 110, the second separator 117 (Hereinafter, will be referred to as 'second distal end separator') may be positioned at the uppermost portion (see FIG. 2) or the lowermost portion (see FIG. 1) of the unit stack part 100. The second auxiliary unit 140 may be additionally stacked on the second distal end separator 117.

More particularly, as illustrated in FIG. 6, when the first electrode 111 is an cathode, and the second electrode 113 is a anode, the second auxiliary unit 140*a* may be formed as the cathode 111. In addition, as illustrated in FIG. 7, when the first electrode 111 is a anode, and the second electrode 113 is an cathode, the second auxiliary unit 140*b* may be formed by stacking from the second distal end separator 117, that is, to the outer portion of the second distal end separator 117 (to the lower portion in FIG. 7), the anode 111, the separator 112 and the cathode 113 one by one. The second auxiliary unit 140 may also include an cathode including an active material layer coated only one side facing the radical unit 110 (one side facing the upper portion in FIG. 7) among both sides of the current collector as for the first auxiliary unit 130. When the unit stack part 100 is formed by additionally stacking the second auxiliary unit 140 on the second distal end separator 117, an cathode including a coated layer only on one side thereof may be positioned at the outermost portion of the second distal end separator 117.

For reference, in FIGS. 4 & 5, and 6 & 7, stacked structures of the first electrode 111, the first separator 112, the second electrode 113 and the second separator 114 one by one, from the upper portion to the lower portion, are illustrated. On the contrary, stacked structures of the first electrode 111, the first separator 112, the second electrode 113 and the second separator 114 one by one, from the lower portion to the upper portion, may be explained by the same manner as described above. The first auxiliary unit 130 and the second auxiliary unit 140 may further include a separator at the outermost portion as occasion demands. For example, when the cathode positioned at the outermost portion is necessary to be electrically insulated from a case, the first auxiliary unit 130 and the second auxiliary unit 140 may further include a separator at the outermost portion of the cathode. For such reasons, a separator may be further included in the cathode exposed to the opposite side to the stacked portion of the second auxiliary unit 140 (the uppermost portion of the electrode assembly in FIG. 6).

Meanwhile, a unit stack part may be preferably manufactured as illustrated in FIGS. 8 to 10. First, a unit stack part 100*e* as illustrated in FIG. 8 may be formed. A radical unit 110*b* may be formed by stacking a first electrode 111, a first separator 112, a second electrode 113 and a second separator 114 from the lower portion to the upper portion, one by one. In this case, the first electrode 111 may be an cathode, and the second electrode 113 may be a anode. A first auxiliary unit 130*c* may be formed by stacking from the first distal electrode 116, that is, from the upper portion to the lower portion as in FIG. 8, the separator 114, the anode 113, the separator 112 and the cathode 111, one by one. In this case, the cathode 111 of the first auxiliary unit 130*c* may include an active material layer formed only on one side facing a radical unit 110*b*.

In addition, a second auxiliary unit 140*c* may be formed by stacking from a second distal end separator 117, and from the lower portion to the upper portion in FIG. 8, an cathode 111 (a first cathode), a separator 112, a anode 113, a separator 114 and an cathode 118 (a second cathode), one by one. In this case, the cathode 118 (the second cathode) positioned at the outermost portion of the second auxiliary unit 140*c* may include an active material layer formed only on one side facing the radical unit 110*b*. For reference, the alignment of the units may be easily conducted when the auxiliary unit includes the separator.

Then, a unit stack part 100f as illustrated in FIG. 9 may be formed. A radical unit 110b may be formed by stacking a first electrode 111, a first separator 112, a second electrode 113 and a second separator 114 one by one from the lower portion to the upper portion. In this case, the first electrode 111 may be an cathode, and the second electrode 113 may be a anode. A first auxiliary unit 130d may be formed by stacking the separator 114, the anode 113 and the separator 112, one by one from a first distal end electrode 116. In this case, a second auxiliary unit may not be provided. For reference, a anode may make a reaction with an aluminum layer of an electrode case (for example, pouch) due to a potential difference. Thus, the anode is preferably insulated from the electrode case by means of the separator.

Finally, a unit stack part 100g as illustrated in FIG. 10 may be formed. A radical unit 110c may be formed by stacking a first electrode 111, a first separator 112, a second electrode 113 and a second separator 114 from the upper portion to the lower portion. In this case, the first electrode 111 may be a anode, and the second electrode 113 may be an cathode. A second auxiliary unit 140d may be formed by stacking the anode 111, the separator 112, the cathode 113, the separator 114 and the anode 119 one by one from a second distal end separator 117. In this case, a first auxiliary unit may not be provided.

Referring to FIG. 11, a fabricating method of an electrode assembly according to the present invention will be explained.

In the fabricating method of an electrode assembly according to the present invention, a step of forming a radical unit (S100) for forming a radical unit 110 having a four-layered structure formed by stacking a first electrode 111, a first separator 112, a second electrode 113 and a second separator 114 one by one, and a step of stacking the radical units for forming a unit stack part 100 (S200) by stacking at least one radical unit 110 one by one are included. The explanation on the radical unit 110 and the unit stack part 100 has been described above, and will be omitted.

The fabricating method of an electrode assembly according to the present invention may further include a step of stacking a first auxiliary unit (S300) in which a first auxiliary unit 130 is stacked on a first distal end electrode 116, which is the first electrode positioned at the uppermost portion or at the lowermost portion of the unit stack part 100. In addition, the fabricating method of the electrode assembly according to the present invention may further include a step of stacking a second auxiliary unit (S400) on a second distal end separator 117, which is the second separator positioned at the uppermost portion or at the lowermost portion of the unit stack part 100. The explanation on the first auxiliary unit 130 and the second auxiliary unit 140 has been described above, and will be omitted.

FIG. 12 illustrates an embodiment on using a fixing member for fixing a unit stack part according to the present invention.

A fabricating method of an electrode assembly according to the present invention may further include a fixing step (S500)by using a fixing part T1 for fixing the side portion or the front portion of the unit stack part 100 including a stacked structure of the radical units 110. That is, in order to confirm the stability of a stacking structure, the unit stack part 100 may be fixed by using a separate member at the side portion thereof. The fixing may be accomplished by taping only the side portions of the unit stack part 100 as illustrated in FIG. 12(a), or by using a fixing part T2 for fixing the whole sides of the unit stack part 100 as illustrated in FIG. 12(b). In addition, a polymer tape may be used as the fixing parts T1 and T2.

Hereinafter, particular materials and constitutional features of constituent elements of the electrode assembly according to the present invention will be explained.

[Cathode Structure]

In the present invention, an electrode provided in a radical unit is classified into an cathode and a anode and is manufactured by combining the cathode and the anode along with a separator interposed therebetween. The cathode may be manufactured, for example, by coating a slurry of a mixture of an cathode active material, a conductive material and a binder on an cathode current collector, drying and pressing. A filler may be added into the mixture as occasion demands. When the cathode is accomplished as a sheet shape to be installed on a roll, the manufacturing rate of the radical unit may be increased.

[Cathode Current Collector]

An cathode current collector is generally manufactured to a thickness of about 3 to 500 μm. For the cathode current collector, a material not inducing the chemical change of a battery and having a high conductivity may be used without limitation. For example, stainless steel, aluminum, nickel, titanium, clacined carbon, a surface treated material of aluminum or stainless steel with carbon, nickel, titanium, silver, or the like may be used. The adhesiveness of an cathode active material may be increased by forming minute embossing on the surface of the cathode current collector. The cathode current collector may have various shapes such as a film, a sheet, a foil, a net, a porous material, a foamed material, a non-woven material, and the like.

[Cathode Active Material]

An cathode active material for a lithium secondary battery may include, for example, a layered compound of lithium cobalt oxide ($LiCoO_2$), lithium nickel oxide ($LiNiO_2$), etc. or a substituted compound with one or more transition metals; lithium manganese oxide such as $Li_{1+x}Mn_{2-x}O_4$ (in which x is 0 to 0.33), $LiMnO_3$, $LiMn_2O_3$, $LiMnO_2$, etc.; lithium copper oxide ($Li_2CuO_2$); vanadium oxide such as $LiV_3O_8$, $LiFe_3O_4$, $V_2O_5$, $Cu_2V_2O_7$, etc.; Ni site-type lithium nickel oxide represented by Chemical Formula of $LiNi_{1-x}M_xO_2$ (in which, M=Co, Mn, Al, Cu, Fe, Mg, B or Ga, x=0.01 to 0.3); lithium manganese complex oxide represented by Chemical Formulae $LiMn_{2-x}M_xO_2$ (in which M=Co, Ni, Fe, Cr, Zn or Ta, and x=0 .01 to 0.1) or $Li_2Mn_3MO_8$ (in which, M=Fe, Co, Ni, Cu or Zn) ; $LiMn_2O_4$ in which a portion of Li is substituted with alkaline earth ions; a disulfide compound; $Fe_2 (MoO_4)_3$, and the like, without limitation.

Generally, a conductive material is added into a mixture including the cathode active material by 1 to 50 wt % based on the total amount of the mixture. Any conductive material having conductivity without inducing the chemical change of a battery may be used without limitation. For example, graphite such as natural graphite, synthetic graphite, etc.; carbon black such as carbon black, acetylene black, ketjen black, channel black, furnace black, lamp black, thermal black, etc.; conductive fiber such as carbon fiber, metal fiber, etc.; a metal powder such as a carbon fluoride powder, an aluminum powder, a nickel powder, etc.; conductive whisker such as potassium titanate, etc.; conductive metal oxide such as titanium oxide, etc.; a conductive material such as polyphenylene derivatives, etc. may be used A binder is a component assisting the bonding of the active material with the conductive material and the bonding with the current collector, and is commonly included by about 1 to 50 wt % based on the total amount of the mixture including the cathode active material. Examples of the binder may include polyfluoro vinylidene, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated EPDM, styrene butadiene rubber, fluorine rubber, various copolymers, etc.

A filler is a component restraining the expansion of the cathode and is selectively used. A material not inducing the chemical change of a battery and having a fiber phase may be used without limitation. For example, olefin-based polymer such as polyethylene, polypropylene, and the like; fiber phase material such as glass fiber, carbon fiber, and the like may be used.

[Anode Structure]

A anode may be manufactured by coating a anode active material on a anode current collector, drying and pressing. A conductive material, a binder, a filler, etc. may be selectively included as occasion demands. When the anode is formed as a sheet shape to be installed on a roll, the manufacturing rate of a radical unit may be increased.

[Anode current Collector]

A anode current collector is generally manufactured to a thickness of about 3 to 500 μm. For the anode current collector, a material not inducing the chemical change of a battery and having conductivity may be used without limitation. For example, copper, stainless steel, aluminum, nickel, titanium, clacined carbon, a surface treated material of copper or stainless steel with carbon, nickel, titanium, silver, an aluminum-cadmium alloy, etc. may be used. Also, as for the cathode current collector, the adhesiveness of the anode active material may be increased by forming minute embossing on the surface of the anode current collector. The anode current collector may have various shapes such as a film, a sheet, a foil, a net, a porous material, a foamed material, a non-woven material, etc.

[Anode Active Material]

A anode active material may include, for example, carbon such as non-graphitizable carbon, graphite-based carbon, etc.; a metal complex oxide such as $Li_xFe_2O_3$ ($0 \leq x \leq 1$), $Li_xWO_2$ ($0 \leq x \leq 1$), $Sn_xMe_{1-x}Me'_yO_z$, (Me: Mn, Fe, Pb, Ge; Me': Al, B, P, Si, elements found in Group 1, Group 2 and Group 3 in a periodic table, halogen; $0 < x \leq 1$; $1 \leq y \leq 3$; $1 \leq z \leq 8$), etc.; a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb^2O_5$, GeO, $GeO_2$, $Bi_2O_3$, $Bi_2O_4$, $Bi_2O_5$, etc .; a conductive polymer such as polyacetylene, etc.; Li—Co—Ni-based material, etc.

[Separator]

A separator according to the present invention forms a radical unit through conducting a simple stacking process apart from a folding process or a roll process to accomplish the simple stacking. Particularly, the attachment of the separator, with the cathode and the anode may be accomplished by melting a separator sheet itself by heat to accomplish attaching and fixing in a laminator. From the above-described process, a pressure is continuously maintained and a stable interface contact between the electrode and the separator sheet may become possible.

Any material that may exhibit insulating properties and have a porous structure for the movement of ions may be used for the manufacture of the separator sheet or the separator interposed between the cathode and the anode of a cell. The separator and the separator sheet may include the same material or not.

For the separator or the separator sheet, for example, an insulating thin film having a high ion transmittance and mechanical strength may be used. The pore diameter of the separator or the separator sheet is commonly about 0.01 to 10 μm, and the thickness thereof is commonly about 5 to 300 μm. As for the separator or the separator sheet, for example, an olefin-based polymer such as chemical-resistant and hydrophobic polypropylene, etc.; a sheet or a non-woven fabric obtained by using glass fiber, polyethylene, or the like, may be used. When a solid electrolyte such as a polymer is used as an electrolyte, the solid electrolyte may also function as the separator. Preferably, a polyethylene film, a polypropylene film, or a multi-layered film obtained by combining the films, or a polymer film for a polymer electrolyte or a gel-type polymer electrolyte such as polyvinylidene fluoride, polyethylene oxide, polyacrylonitrile, or polyvinylidene fluoride hexafluoropropylene copolymer, may be used.

The electrode assembly according to the present invention may be applied in an electrochemical cell producing electricity through the electrochemical reaction of a cathode and a anode. Typical examples of the electrochemical cell include a super capacitor, an ultra capacitor, a secondary battery, a fuel cell, all sorts of sensors, an apparatus for electrolysis, an electrochemical reactor, and the like. The secondary battery is particularly preferred.

Secondary battery has a structure in which a chargeable/dischargeable electrode assembly having an impregnated state with an ion-containing electrolyte is built in a battery case. In a preferred embodiment, the secondary battery may be a lithium secondary battery.

Recently, a lithium secondary battery attracts much concern as a power source of a large size device as well as a small size mobile device. A light weight lithium secondary battery may be preferred for applying thereof in these fields. As one method of decreasing the weight of the secondary battery, a built-in structure including an electrode assembly in a pouch-type case of an aluminum laminate sheet may be used. Since the features on the lithium secondary battery are well known in this art, the explanation on the lithium secondary battery will be omitted.

In addition, as described above, when the lithium secondary battery is used as the power source of a medium and large size device, a secondary battery maximally restraining the deterioration of an operating performance for a long time, having good lifetime properties and having a structure possibly being mass-produced with a lower cost, may be preferred. From this point of view, the secondary battery including the electrode assembly of the present invention may be preferably used as a unit battery in a medium and large size battery module.

A battery pack including a battery module including a plurality of secondary batteries may be used as a power source in at least one medium and large size device selected from the group consisting of a power tool; an electric vehicle selected from the group consisting of an electric vehicle (EV), a hybrid electric vehicle (HEV), and a plug-in hybrid electric vehicle (PHEV); an E-bike; an E-scooter; an electric golf cart; an electric truck; and an electric commercial vehicle.

The medium and large size battery module is constituted of a plurality of unit batteries connected in a serial system or a serial/parallel system so as to provide a high output and high capacity. The techniques on these features are well known in this art. Thus, the explanation on the features will be omitted in this application.

While the present invention has been shown and described in connection with the exemplary embodiments, it will be apparent to those skilled in the art that modifications and variations can be made without departing from the spirit and scope of the invention as defined by the appended claims.

What is claimed is:

1. A fabricating method of an electrode assembly comprising:
forming a radical unit having a four-layered structure obtained by stacking a first electrode, a first separator, a second electrode, and a second separator one by one, wherein forming the radical unit includes:
step 1, coating the first and second separators with a coating material having adhesiveness by coating both sides of the first separator and coating only one side of the second separator;
step 2, cutting the first electrode and the second electrode;
step 3, attaching the first electrode, the first separator, the second electrode, and the second separator to each other simultaneously by bringing the first electrode, the first separator, the second electrode and the second separator into a parallel orientation such that the coated sides of the first separator face the first electrode and the second electrode and that the only coated side of the second separator faces the second electrode; and
step 4, cutting the first separator and the second separator so as to be longer than the first electrode and the second electrode; and
stacking at least two radical units one by one to form a unit stack part.

2. The fabricating method of an electrode assembly of claim 1, wherein an attachment of the first electrode, the first separator, the second electrode, and the second separator is conducted by pressurizing or by applying pressure and heat.

3. The fabricating method of an electrode assembly of claim 1, wherein the coating material is a mixture of inorganic particles and a binder polymer.

4. The fabricating method of an electrode assembly of claim 1, wherein the radical unit is obtained by repeatedly stacking the four-layered structure.

5. The fabricating method of an electrode assembly of claim 1, further comprising stacking of first auxiliary unit on a first distal end electrode, the first distal end electrode being the first electrode positioned at an uppermost or a lowermost portion of the unit stack part,
when the first electrode being a cathode, and the second electrode being an anode, the first auxiliary unit being formed by stacking from the first distal end electrode, the separator, the anode, the separator and the cathode one by one,
when the first electrode being the anode, and the second electrode being the cathode, the first auxiliary unit being formed by stacking from the first distal end electrode, the separator and the cathode one by one.

6. The fabricating method of an electrode assembly of claim 5, wherein the cathode of the first auxiliary unit comprises:
a current collector; and
an active material coated only on one side facing the radical unit among both sides of the current collector.

7. The fabricating method of an electrode assembly of claim 1, further comprising stacking a first auxiliary unit on a first distal end electrode, the first distal end electrode being the first electrode positioned at an uppermost or a lowermost portion of the unit stack part,
when the first electrode being a cathode, and the second electrode being an anode, the first auxiliary unit being formed by stacking from the first distal end electrode, the separator, the anode, and the separator one by one.

8. The fabricating method of an electrode assembly of claim 1, wherein the unit stack part further comprises a second auxiliary unit stacked on a second distal end separator, the second distal end separator being the second separator positioned at an uppermost or a lowermost portion of the unit stack part,
when the first electrode being a cathode, and the second electrode being an anode, the second auxiliary unit being formed by stacking from the second distal end separator, the anode, the separator and the cathode one by one.

9. The fabricating method of an electrode assembly of claim 8, wherein the cathode of the secondary auxiliary unit comprises:
a current collector; and
an active material coated only on one side facing the radical unit among both sides of the current collector.

10. The fabricating method of an electrode assembly of claim 1, further comprising stacking a second auxiliary unit on a second distal end separator, the second distal end separator being the second separator positioned at an uppermost or a lowermost portion of the unit stack part,
when the first electrode being a cathode, and the second electrode being an anode, the second auxiliary unit being formed by stacking from the second distal end separator, the first cathode, the separator, the anode, the separator and the second cathode one by one,
the second cathode of the secondary auxiliary unit comprising a current collector and an active material coated only on one side facing the radical unit among both sides of the current collector.

11. The fabricating method of an electrode assembly of claim 1, further comprising stacking a second auxiliary unit on a second distal end separator, the second distal end separator being the second separator positioned at an uppermost or a lowermost portion of the unit stack part,
when the first electrode being an anode, and the second electrode being a cathode, the second auxiliary unit being formed by stacking from the second distal end separator, the anode, the separator, the cathode, the separator and the anode, one by one.

12. The fabricating method of an electrode assembly of claim 1, further comprising fixing by using a polymer tape for taping a side portion or a front portion of the unit stack part.

13. An electrochemical device comprising the electrode assembly obtained by the fabricating method according to claim 1.

14. The fabricating method of an electrode assembly of claim 1, wherein stacking does not include folding.

* * * * *